Patented Sept. 1, 1931

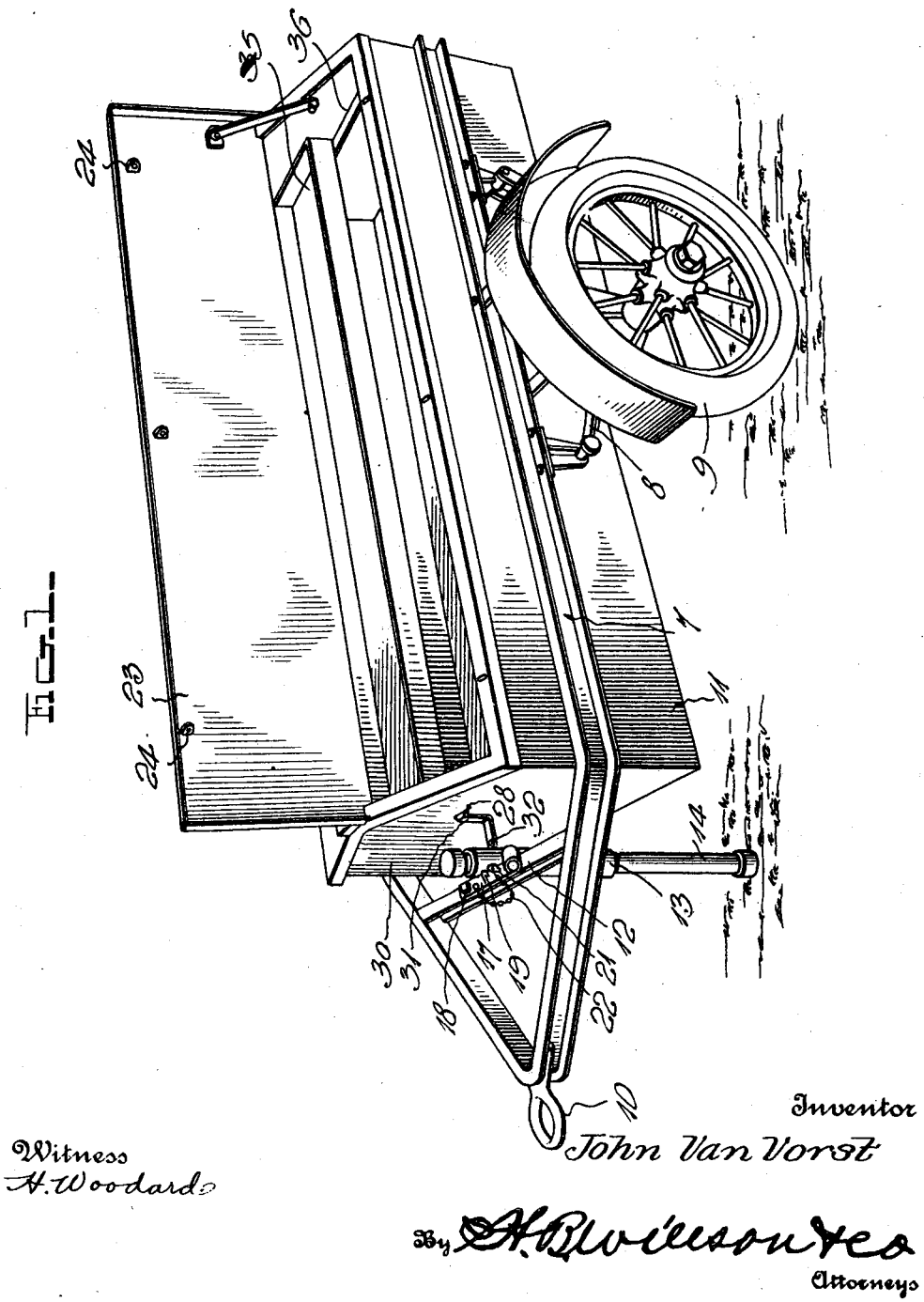

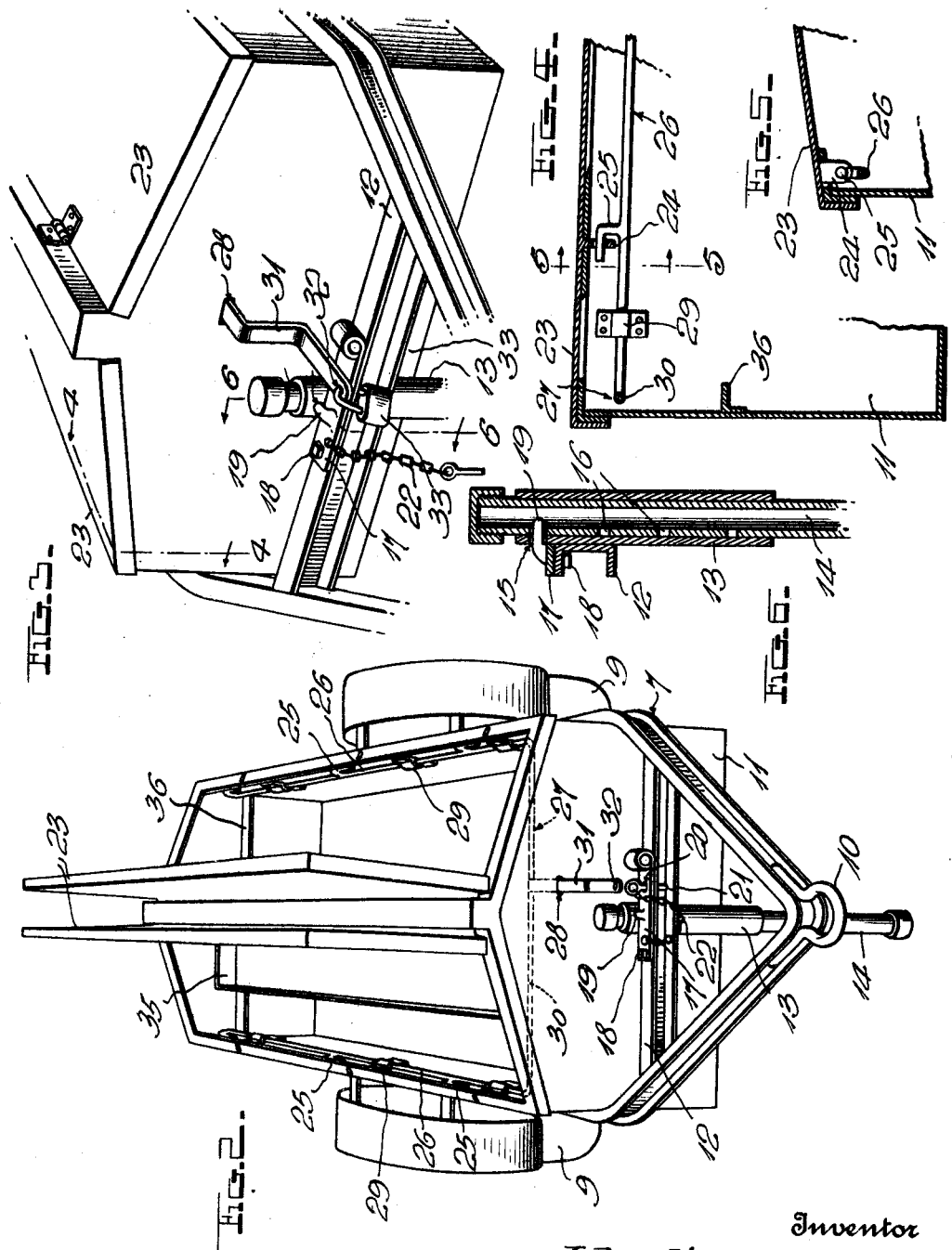

1,821,593

UNITED STATES PATENT OFFICE

JOHN VAN VORST, OF SCHENECTADY, NEW YORK, ASSIGNOR TO MOHAWK ASPHALT HEATER COMPANY, OF SCHENECTADY, NEW YORK, A COPARTNERSHIP COMPOSED OF JOHN VAN VORST AND GEORGE M. BAKER

TRAILER

Application filed March 28, 1930. Serial No. 439,689.

The invention relates to land vehicles in general but more particularly to trailers such as those used by linemen and others for hauling tools and equipment behind automobiles or motor trucks. Trailers of this general type, commonly embody a receptacle having a hinged door which is locked closed when the trailer is being drawn from one place to another or left unattended, and it is also common to provide such trailers with a vertically shiftable leg which is locked in lowered position when the trailer stands uncoupled but is locked in raised position when towing.

It is the principal aim of my invention to provide a novel construction and relation of parts whereby a single master locking means holds the door closed and holds the leg in either raised or lowered position, as required, and in attaining this end, further objects are the provision of novel sub-combinations of parts for fastening the door and the leg, respectively.

Yet another aim is to provide a trailer receptacle provided with two doors pivotally mounted near the longitudinal center of the receptacle and forming parts of a complete cover for said receptacle, and to provide a tray slidably supported within said receptacle and adapted to occupy a position under either of said doors or covers, thereby allowing easy access to the tray when either of said doors or covers is opened.

With the foregoing in view, the invention resides in the novel subject matter hereinafter described and claimed, description being accomplished by reference to the accompanying drawings.

Fig. 1 is a perspective view showing the cover-fastening means released and one of the covers swung upwardly.

Fig. 2 is a perspective view looking rearwardly and showing the cover-locking means released and both covers swung upwardly.

Fig. 3 is an enlarged perspective view similar to a portion of Fig. 1 but showing both the leg-fastening means and the cover-fastening means locked in operative position.

Fig. 4 is a detail longitudinal sectional view cut on the plane indicated by line 4—4 of Fig. 3.

Fig. 5 is a vertical sectional view on line 5—5 of Fig. 4.

Fig. 6 is a detail sectional view through a portion of the leg and its mounting means, as indicated by line 5—5 of Fig. 3.

The drawings above briefly described, illustrate the preferred form of construction, and while this construction will be herein specifically explained, it is to be understood that within the scope of the invention as claimed, variations may be made.

The numeral 7 denotes a chassis frame supported by appropriate springs 8 and wheels 9 and provided with an eye 10 at its front end for engagement with a coupler or hitch. An elongated receptacle 11 is carried by the frame 7 and said frame is provided with a transverse bar 12 spaced forwardly from said receptacle. Welded or otherwise rigidly secured to the bar 12, is a vertical tubular leg guide 13 in which a leg 14 is slidably received, said guide being formed with an opening 15 above the bar 12, while leg 14 is provided with a number of openings 16, any one of which may be alined with said opening 15. A leg-fastening arm 17 is pivoted upon the bar 12 at one end as denoted at 18, said arm 17 being provided with a rigid rearwardly projecting finger 19 for passage through the opening 15 and the opening 16 alined with said opening 15. The arm 17 and the bar 12 are provided with alined openings such as 20 to receive a lock hereinafter described, and if desired, a pin 21 may be provided for passage through these openings when the lock is released. This pin may be carried by a chain 22. When arm 17 is released and forwardly swung, its finger 19 frees the leg 14, allowing the latter to be raised or lowered as required, after which fastening of said arm in operative position, will hold the leg in the position at which it has been set.

The receptacle 11 is provided with two hinged upwardly swingable covers 23 provided with downwardly projecting apertured lugs 24 with which L-shaped locking elements 25 are engageable, as shown in Figs. 1, 2, 4 and 5. The elements 25 are rigid with the two parallel arm portions 26 of a U-shaped rod or bolt 27, said rod being within the receptacle 11 and having its arm portions 26 mounted in suitable guides 29.

The arm-connecting portion 30 of the rod 27 is disposed near the front wall of the receptacle 11 and is provided with a forwardly and downwardly projecting arm 31 passing slidably through an opening 28 in said front wall, said arm 31 having an opening 32 for registration with the openings 20 of the arm 17 and bar 12 when the rod 27 is forwardly pulled to cover-fastening position and said arm 17 is rearwardly swung to leg-fastening position. Then, the shackle of a padlock 33 may be passed through the openings as shown in Fig. 3 to prevent unauthorized disconnection of the parts 17 and 31. As long as this lock is in position, the U-shaped rod 27 cannot be forced rearwardly to release the cover-fastening elements 25, and the arm 17 cannot be swung forwardly to release the leg 14. Consequently, the single lock performs the functions heretofore requiring a plurality of locks, either when the trailer is to be towed with its leg raised or is to be left standing with said leg lowered.

When towing the trailer or when it is left locked, pin 21 is idle, but when the U-shaped bar 27 is unlocked and forced rearwardly as in Figs. 1 and 2, said pin may be used to hold the leg fastening arm 17 in its operative position, or the lock 33 may be used for this purpose.

Within the receptacle 11, various bins, compartments, hangers, etc. may be provided for tools, supplies, equipment and the like, and I prefer to provide a tray 35 of less width than said receptacle 11, said tray being supported by cleats 36 secured to the inner sides of the end walls of the receptacle. This tray may be slid along the cleats 36 and hence is accessible when either of the covers 23 is opened.

It will be seen from the foregoing that rather simple yet efficient and desirable provision has been made for fulfilling the objects of the invention, and attention is again invited to the fact that within the scope of said invention as claimed, variations may be made. If desired, the pin 21 could be omitted and the lock 33 connected with the chain 22, or both pin and chain could be dispensed with.

I claim:

1. In a vehicle having a vertically shiftable, ground-engaging leg and a receptacle provided with a door; fastening means for holding said leg in raised or lowered position, and fastening means being movable to and from operative position, fastening means for said door also movable to and from operative position, and master locking means for locking both of said fastening means in operative position.

2. In a vehicle having a vertically shiftable ground-engaging leg and a receptacle provided with a door; fastening means for holding said leg in raised or lowered position, said fastening means being movable to and from operative position, fastening means for said door also movable to and from operative position, and master locking means for locking both of said fastening means together to hold them in operative position.

3. In a vehicle having a vertically shiftable ground-engaging leg and a receptacle provided with a door; fastening means for said leg movable to and from operative position, fastening means for said door also movable to and from operative position, the two fastening means being movable in opposite directions to effect release thereof, and master locking means for locking said two fastening means to each other when in operative position.

4. In a vehicle having a receptacle provided with a door, a frame member in advance of said receptacle, a vertical guide rigidly carried by said frame member, and a vertically shiftable leg slidable in said guide; a fastening bolt for said door, said bolt being slidable longitudinally of said receptacle and having a terminal adjacent said frame member, a leg-fastening member movably mounted on said frame member for holding said leg in a selected position, and master locking means for locking said bolt terminal and said leg-fastening member together when both thereof are in operative position.

5. In a vehicle having a receptacle provided with a door, a frame member in advance of said receptacle, a vertical guide rigidly carried by said frame member, and a vertically shiftable leg slidable in said guide; a fastening member for said leg, said leg-fastening member being mounted on said frame member, a bolt for fastening said door, said bolt having a terminal near said leg-fastening member, and means for locking said bolt terminal, said leg-fastening member and said frame member together when said bolt and leg-fastening member are in operative position.

6. In a vehicle having a receptacle provided with a door, a frame member in advance of said receptacle, a vertical guide rigidly carried by said frame member, and a vertically shiftable leg slidable in said guide; a fastening member for said leg, said member being mounted on said frame member, a bolt for fastening said door, said bolt being slidable longitudinally of said receptacle and having a terminal near said leg-fastening member, the latter and said bolt terminal having openings which aline when they are in operative positions, and a lock for passage through said openings for locking said terminal and leg-fastening member together.

7. In a vehicle having a receptacle provided with a door, a frame member in advance of said receptacle, a vertical guide rigidly carried by said frame member, and a vertically shiftable leg slidable in said guide; a bolt slidably mounted within said receptacle and provided with means for fastening said door, said bolt having a terminal over said frame member, a leg-fastening member mounted upon said frame member for horizontal movement to and from operative position, said leg-fastening member, said frame member and said bolt terminal having openings which aline when said bolt and leg-fastening member are in operative position, and a padlock for passage through said openings.

8. In a vehicle having a transverse frame bar, a vertical tubular guide secured thereto, and a vertically shiftable leg slidable in said guide; a horizontally swingable arm pivoted to said bar and having a finger, said leg and guide having openings through which said finger passes, said arm and said frame bar having registering openings, and means inserted normally through these openings for connecting said arm to said bar to prevent swinging of the former to released position.

9. In a vehicle having a receptacle provided with a door, a frame member in advance of said receptacle, a vertical guide rigidly carried by said frame member, and a vertically shiftable ground-engaging leg slidable in said guide; fastening means for said door having a terminal adjacent said frame member, a leg-fastening member movably mounted on said frame member for holding said leg in a selected position, and master locking means for locking said terminal and said leg-fastening member to said frame member when said door-fastening means and said leg-fastening member are in operative position.

10. In a vehicle having a receptacle provided with a door, a frame member in advance of said receptacle, a vertical guide rigidly carried by said frame member, and a vertically shiftable ground-engaging leg slidable in said guide; fastening means for said door having a terminal adjacent said frame member, a leg-fastening member movably mounted on said frame member for holding said leg in a selected position, and master locking means for locking said terminal and said leg-fastening member to each other when said door-fastening means and said leg-fastening member are in operative position.

11. In a vehicle having a receptacle provided with a door, a frame member in advance of said receptacle, a vertical guide rigidly carried by said frame member, and a vertically shiftable ground-engaging leg slidable in said guide; fastening means for said door having a terminal adjacent said frame member, a leg-fastening member movably mounted on said frame member for holding said leg in a selected position, and master locking means for locking said terminal and said leg-fastening member to each other and to said frame member when said door-fastening means and said leg-fastening member are in operative position.

In testimony whereof I have hereunto affixed my signature.

JOHN VAN VORST.